(12) United States Patent
Uchiyama

(10) Patent No.: US 6,660,951 B2
(45) Date of Patent: Dec. 9, 2003

(54) CANCELING STRUCTURE OF COMBINATION SWITCH

(75) Inventor: Norio Uchiyama, Tokyo (JP)

(73) Assignee: Niles Parts Ltd. (JP)

( * ) Notice: Subject to any disclaimer, the term of this patent is extended or adjusted under 35 U.S.C. 154(b) by 0 days.

(21) Appl. No.: 10/270,566

(22) Filed: Oct. 16, 2002

(65) Prior Publication Data

US 2003/0075424 A1 Apr. 24, 2003

(30) Foreign Application Priority Data

Oct. 24, 2001  (JP) ..................................... P2001-326905

(51) Int. Cl.⁷ ................................................. H01H 3/16
(52) U.S. Cl. ........................... 200/61.3; 200/61; 200/27
(58) Field of Search ........................... 200/61.27, 61.3, 200/61.31, 61.35, 61.36, 61.54

(56) References Cited

U.S. PATENT DOCUMENTS

| | | | | |
|---|---|---|---|---|
| 4,939,540 A | * | 7/1990 | Kamada et al. | 200/61.27 |
| 5,030,802 A | * | 7/1991 | Noro | 200/61.27 |
| 5,575,177 A | * | 11/1996 | Poleschuk et al. | 200/61.3 |
| 5,646,384 A | * | 7/1997 | Noro et al. | 200/61.3 |
| 5,994,653 A | * | 11/1999 | Poleshuk et al. | 200/61.3 |
| 6,237,437 B1 | * | 5/2001 | Takahashi | 200/61.35 |
| 6,472,623 B1 | * | 10/2002 | Hayashi | 200/61.27 |

FOREIGN PATENT DOCUMENTS

JP            2001-10406        1/2001

* cited by examiner

*Primary Examiner*—Elvin Enad
*Assistant Examiner*—M. Fishman
(74) *Attorney, Agent, or Firm*—Radar, Fishman & Grauer PLLC

(57) ABSTRACT

A canceling structure of a combination switch is disclosed, which ensures the returning moment of a cancel cam without increasing the size of a spring. A cancel cam 20 placed on a swing block that can be rotated with a control lever includes pressure contact surfaces 22 on a plane passing through the shaft center of an upper shaft 9b, and the upper shaft 9b is guided along a long hole 9b of a cover. An elastic contact material 30 has pressure surfaces 32 to be brought into contact with the pressure contact surfaces of the cancel cam, and is biased toward the cancel cam along a guide 6d by a coil spring 11 inserted into a blind hole 12b. The pressure surfaces 32 have a shaft-escaping recessed portion 34 forming a predetermined gap between them and the upper shaft 9b when brought into contact with the pressure contact surfaces of the cancel cam. Since the pressure contact surfaces pass through the rotating shaft center, the angel from the shaft center to a contact point with the pressure surface 32, thereby increasing a returning moment by the pressure of the elastic contact material. Also, since the elastic contact material is long, the movement along the guide becomes smooth.

2 Claims, 8 Drawing Sheets

CANCELING STRUCTURE OF COMBINATION SWITCH

BACKGROUND OF THE INVENTION

1. Field of the Invention

The present invention relates to a canceling structure of a combination switch, such as a turn signal switch for activating, for example, a turn signal lamp of a vehicle.

2. Description of Related Art

As such a canceling structure, there is a canceling structure of a turn signal switch as previously proposed by the inventor in JP-A-2001-10406. A turn signal switch incorporating this canceling structure is shown in FIGS. 4 and 5.

In this case, a swing block 2 having a control lever 1 is rotatably supported by a casing 3 and a cover 6 around a shaft 2a, and a cancel cam 9 is disposed between the swing block 2 and the cover 6. Referring to FIG. 5, the control lever 1 can be rotated vertically in the direction shown by arrows C and D around a lever shaft Q relative to the swing block 2; however, referring to FIG. 4, the control lever 1 is rotated horizontally in the direction shown by arrows A and B along with the swing block 2 around the shaft 2a to move in the direction corresponding to the rotation of a steering shaft 14.

The swing block 2 includes an arm 2k for pushing a moderate body 8 at the end thereof biased by a moderate spring 7 against a moderate groove 3b formed in the casing 3.

An upper shaft 9b of the cancel cam 9 can be moved along a long hole 6b formed in the cover 6 in a normal mode. As particularly shown in an enlarged view of FIG. 6, the cancel cam 9 is biased longitudinally toward a steering shaft 14 by a coil spring 11 via an elastic contact material 12. In the drawing, reference numeral 6d denotes a guide formed at the lower surface of the cover 6 and guides the elastic contact material 12 on the line connecting the steering shaft 14 with the shaft 2a of the swing block 2.

Returning to FIGS. 4 and 5, the swing block 2 is provided with a support groove 2c for receiving a lower shaft 9a coaxial with the upper shaft 9b of the cancel cam 9. The support groove 2c includes an angular projection 2d at the center thereof in the direction from the steering shaft 14 toward the shaft 2a of the swing block 2. When the control lever 1 is in a neutral position, the lower shaft 9a of the cancel cam 9 is positioned at the top of the angular projection 2d and a butting portion 9c is positioned out of a rotating path of the cancel pin 10.

As shown in FIG. 6, the cancel cam 9 includes a pressure contact surface 9e in contact with the upper shaft 9b and coming into contact with a pushing face 12a of the elastic contact material 12, the butting portion 9c extending toward the steering shaft 14, and a pressure portion 9d extending toward the shaft 2a for pushing against a cam guide 13, which will be described later. FIG. 7 is an enlarged perspective view showing the cancel cam 9, the elastic contact material 12, and the coil spring 11.

The cam guide 13 is formed in substantially U shape in FIG. 4, which is slidably placed on the swing block 2 only along the shaft 2a of the swing block 2, is pushed by a pressure spring 15 to be biased toward the cancel cam 9, movement of projections 13a formed on right and left sides thereof toward the steering shaft 14 is limited by a support 2h, and the inner wall in the U-shape is separated from the pressure portion 9d of the cancel cam.

When the control lever 1 is operated toward a leftward indicating position shown by arrow A to rotate the swing block 2 integrated with the control lever 1 around the shaft 2a, the angular projection 2d of the support groove 2c is moved and the cancel cam 9 is pushed by the elastic contact material 12 biased by the coil spring 11, and the lower shaft 9a slides down the slope of the angular projection 2d to move to the base of the angular projection 2d and the upper shaft 9b is moved toward the steering shaft 14 along the long hole 6b in the cover 6. Consequently, the butting portion 9c of the cancel cam 9 projects into the rotating path of the cancel pin 10 which rotates along with the steering shaft 14.

The cam guide 13 is rotated around the shaft 2a along with the swing block 2. As a result, the sidewall of the cam guide 13, on the upper side in FIG. 4, is positioned in contact with the side end of the pressure portion 9d of the cancel cam 9. The swing block 2 slides a moving part having a moving contact for a turn signal lamp, and thus, the moving contact is brought into contact with a fixed contact to blink a left turn signal lamp.

In this state, when a steering handle is operated in the same direction as the control lever 1 to rotate the steering shaft 14 leftward in the direction shown by arrow J, the cancel pin 10 pushes the butting portion 9c in the direction shown by arrow E to rotate the cancel cam 9 around the lower shaft 9a and the upper shaft 9b.

During the rotation, the pressure portion 9d of the cancel cam is only separated from the sidewall of the cam guide 13 that was close thereto, not obstructing the rotation.

By the rotation, the pressure contact surface 9e of the cancel cam 9 is rotated to compress the coil spring 11 via the elastic contact material 12; however, since a contact point between the pressure contact surface 9e and the elastic contact material 12 is separated from the lower shaft 9a and the upper shaft 9b, the cancel cam 9 is subjected to a rotating force by the coil spring 11, thereby returning to an initial state after the cancel pin 10 has been separated from the butting portion 9c.

During this period of time, since the swing block 2 pushes the moderate body 8 at the end of the arm against the cam groove 3b, the control lever 1 is held in the leftward indicating position rotated in the direction shown by arrow A.

Next, in this leftward indicating position, when the steering handle is operated to rotate the steering shaft 14 rightward in the direction shown by arrow K, the cancel pin 10 pushes the butting portion 9c in the direction shown by arrow F to rotate the cancel cam 9 around the lower shaft 9a and the upper shaft 9b.

By this rotation, the pressure portion 9d of the cancel cam pushes at the sidewall of the cam guide 13 which was close thereto. Accordingly, the swing block 2 having the cam guide 13 is rotated in the direction shown by arrow B to return to the neutral position, and the control lever 1 also returns to OFF position automatically, thereby turning off the left turn signal lamp.

With the return of the swing block 2, the angular projection 2d of the support groove 2c biases the lower shaft 9a to move the cancel cam 9 in the direction apart from the steering shaft 14, thus separating the butting portion 9c from the rotating path of the cancel pin 10.

The same goes for a case in which the control lever 1 is operated in the direction shown by arrow B, except that the direction of operation is reversed.

When the control lever 1 is rotated leftward in the direction shown by arrow A, and with the position held by hand, the steering handle is rotated rightward in the direction of returning the control lever 1 automatically, the cancel cam 9 which is forced to rotate by the pressure of the cancel pin 10 rotating in the direction shown by arrow K rotates in the direction shown by arrow F to push the pressure portion 9d against the sidewall of the cam guide 13. In this case, since the sidewall of the cam guide 13 is inclined, the cam guide 13 is moved toward the shaft 2a against the pressure spring 15, the rotation of the cancel pin 10 and the cancel cam 9 is allowed, thus causing no damage by the application of an excessive force.

When the cancel pin 10 is further rotated and passes through the cancel cam 9, the cam guide 13 returns to a position before the cancel cam 9 abuts thereon by the elasticity of the pressure spring 15, and the cancel pin 10 returns there by the elasticity of the coil spring 11.

The same goes for the case in which the control lever 1 is operated inversely and held therein.

The other structures including the connecting structure of the control lever 1 to the swing block 2 and the operation thereof are specifically described in JP-A-2001-10406.

With such a structure, when the control lever 1 is operated to rotate the steering handle in a desired rotating direction, and then the steering handle is returned, the control lever 1 returns automatically to the neutral position.

The coil spring 11 for returning the cancel cam 9 onto a line connecting the steering shaft 14 and the shaft 2a of the swing block is arranged to be aligned with the line, thus having the advantage of reducing the occupied area of the returning structure and also the width of the casing.

In the canceling structure of the turn signal switch described above, the pressure contact surface 9e of the cancel cam 9 is formed as a plane in contact with the upper shaft 9b, and similarly, the pressure surface 12a of the elastic contact material 12 in contact with the pressure contact surface 9e is shaped in plane. However, after the butting portion 9c of the cancel cam 9 has been pushed by the cancel pin 10 rotating in the same direction as the control lever to rotate around the upper shaft 9b (and the lower shaft 9a), sometimes the cancel cam 9 cannot return smoothly.

The following may be a cause after the consideration of the above problems.

When the cancel cam 9 is rotated, the coil spring 11 is compressed to displace the elastic contact material 12 and the corner at the side end of the pressure contact surface 9e of the cancel cam 9 is brought into contact with the pressure surface 12a of the elastic contact material 12, as shown in FIG. 8.

Assuming that the rotating angle of the cancel cam 9 is α, the angle formed by the pressure contact surface 9e and the line connecting the rotating shaft (upper shaft 9b) of the cancel cam 9 and the pressure surface 12a of the elastic contact material 12 is β, the distance between the rotating shaft of the cancel cam 9 and the contact point is s, the pushing force from the elastic contact material 12 by the coil spring 11 is P, and the component force perpendicular to the line connecting the rotating shaft of the cancel cam 9 having a pushing force P and the contact point is W, component force W and moment T for returning the cancel cam 9 are expressed as follows:

$W = P \times \cos(\alpha + \beta)$ $T = W \times s$

Accordingly, it is considered to be a cause that since the angle (α+β) from the rotating shaft to the contact point is relatively large, value W decreases, thus not obtaining a sufficient moment.

If pressure force P is increased for measures against it, the size of the coil spring 11 is increased, making it difficult to arrange it in a narrow space between the cover 6 and the swing block 2.

Similarly, since the elastic contact material 12 must be decreased in length in the limited space on the swing block 2, the inclination of the elastic contact material 12 tends to increase, thus making it impossible to slide on the guide smoothly.

SUMMARY OF THE INVENTION

Accordingly, in consideration of the above problems, it is an object of the present invention to provide a canceling structure of a combination switch in which a sufficient moment is ensured to return the cancel cam, and a smooth motion of the elastic contact is provided without increasing the size of the spring.

To this end, according to an aspect of the invention, there is provided a canceling structure of a combination switch constructed such that a swing block for supporting a control lever is rotatably held on a fixing side; when the control lever is rotated from a neutral position, a cancel cam moves into the path of a cancel pin with the rotation of the swing block; and the cancel cam biases the swing block with the movement of the cancel pin in the opposite direction from the operating direction of the control lever, thereby returning the control lever to the neutral position, wherein the cancel cam comprises a shaft to be guided by a long hole provided on the fixing side in parallel with the direction to move into the path of the cancel pin; pressure contact surfaces are provided at positions on the peripheral surface of the shaft, closer to a steering shaft than to the control lever; when the cancel pin moves in the same direction as the operating direction of the control lever, the end thereof is pushed by the cancel pin, and allowed to rotate around the shaft; an elastic contact material having pressure surfaces that can be brought into contact with the pressure contact surfaces of the cancel cam is biased along a guide in the moving direction of the cancel cam; when the cancel cam rotates, the side end of the pressure contact surface is pushed by the pressure surface of the elastic contact material; and when released from the cancel pin, the cancel cam returns to a position before rotation by the pressure from the elastic contact material.

Since the pressure contact surfaces of the cancel cam pass through almost the center of the shaft, the component force in the direction of returning rotation by the pressure of the elastic contact material increases as compared with the case of being apart from the shaft.

According to another aspect of the invention, the shaft of the cancel cam expands from the pressure contact surfaces toward the elastic contact material and the pressure surfaces of the elastic contact material have a recessed portion for escaping the extension portion of the shaft.

Even when the shaft expands, the pressure surfaces of the elastic contact material can be brought into contact with the pressure contact surfaces of the cancel cam, thus increasing the length of the elastic contact material by the length that the pressure surfaces are extended to the pressure contact surfaces.

DESCRIPTION OF THE PREFERRED EMBODIMENTS

An embodiment of the present invention will be described hereinbelow with reference to the drawings.

Figure 1:
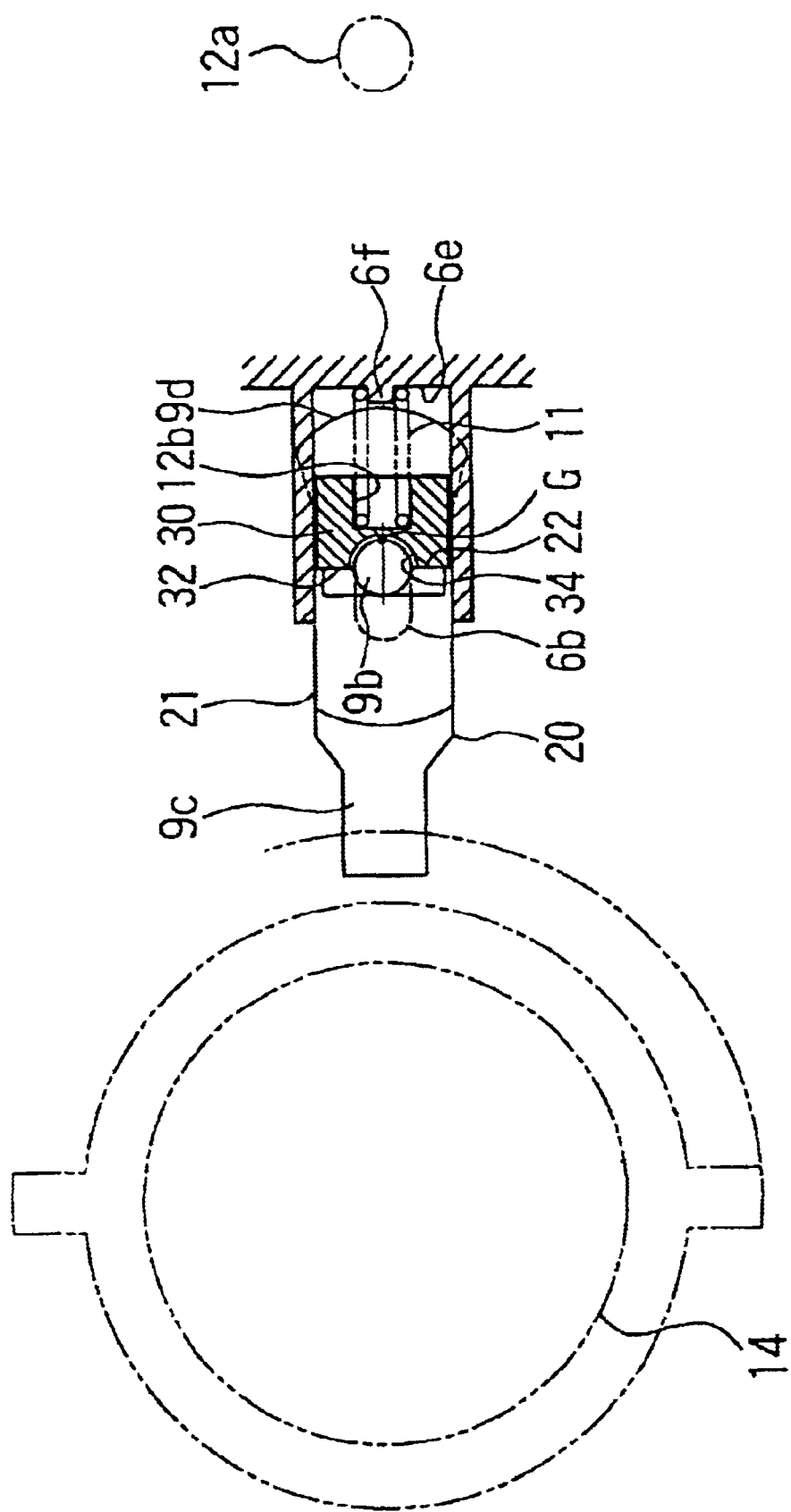
FIG. 1 is a plan view of parts around a cancel cam, showing an embodiment of the present invention.
Figure 6:
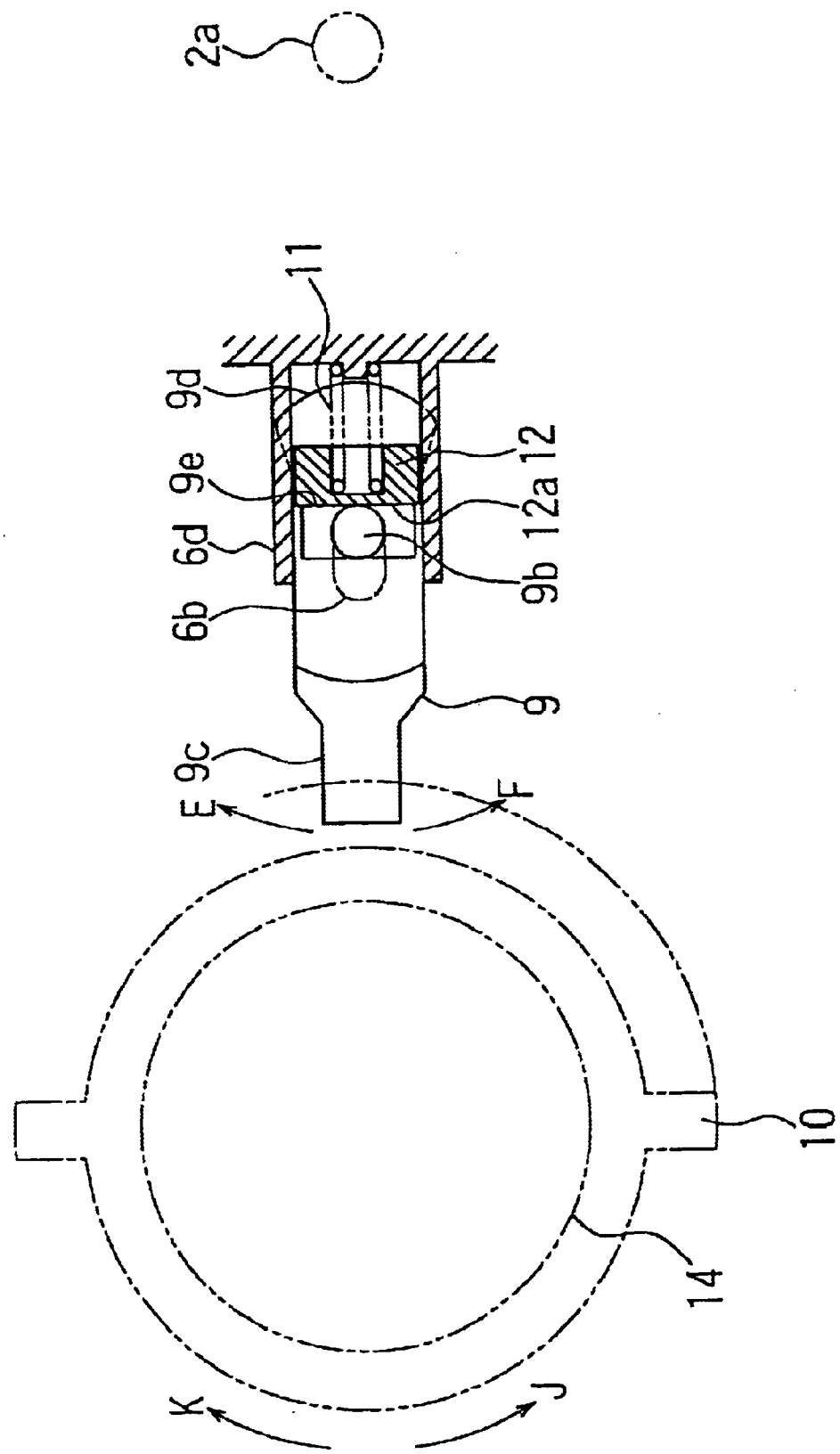
FIG. 6 is an enlarged plan view of parts around a cancel cam in the conventional art.

FIG. 1 is a plan view of parts around a cancel cam, corresponding to FIG. 6, showing an embodiment of the present invention.

Figure 2:
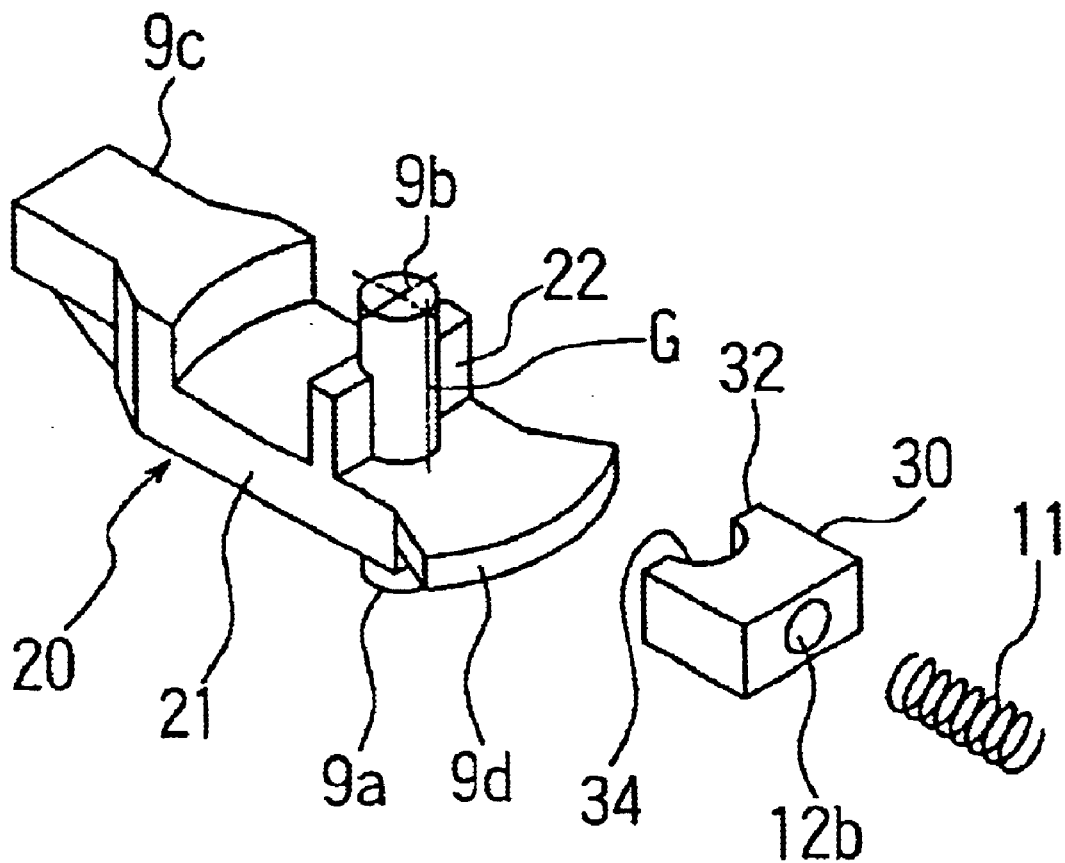
FIG. 2 is a perspective view of the cancel cam, an elastic contact material, and a coil spring.
Figure 7:
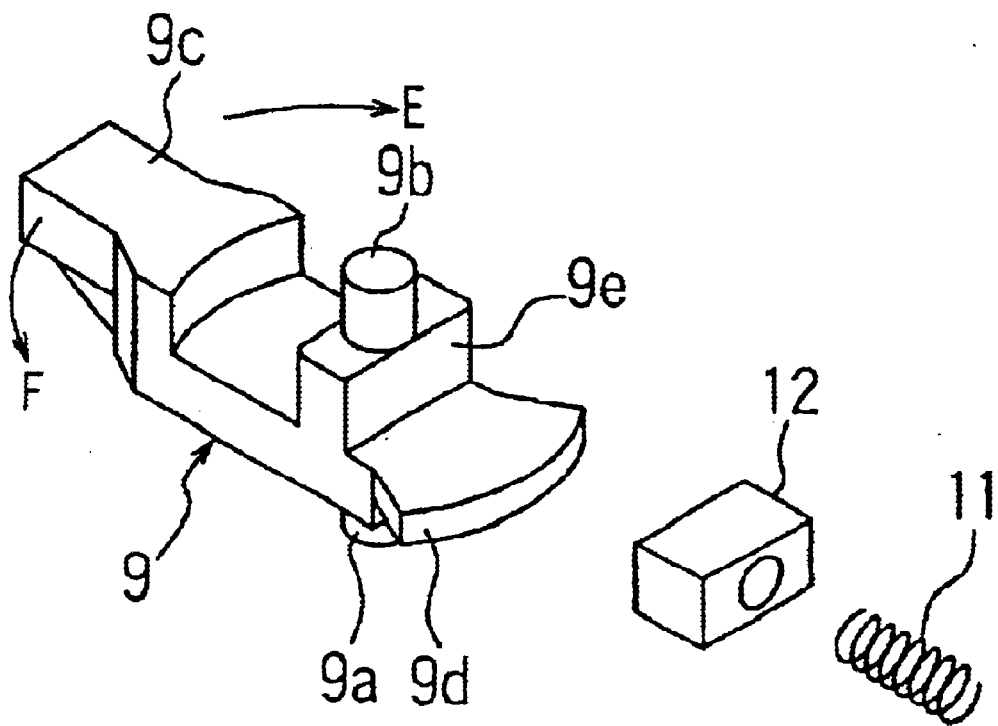
FIG. 7 is a perspective view showing the cancel cam, an elastic contact material, and a coil spring in the conventional art.
Figure 8:
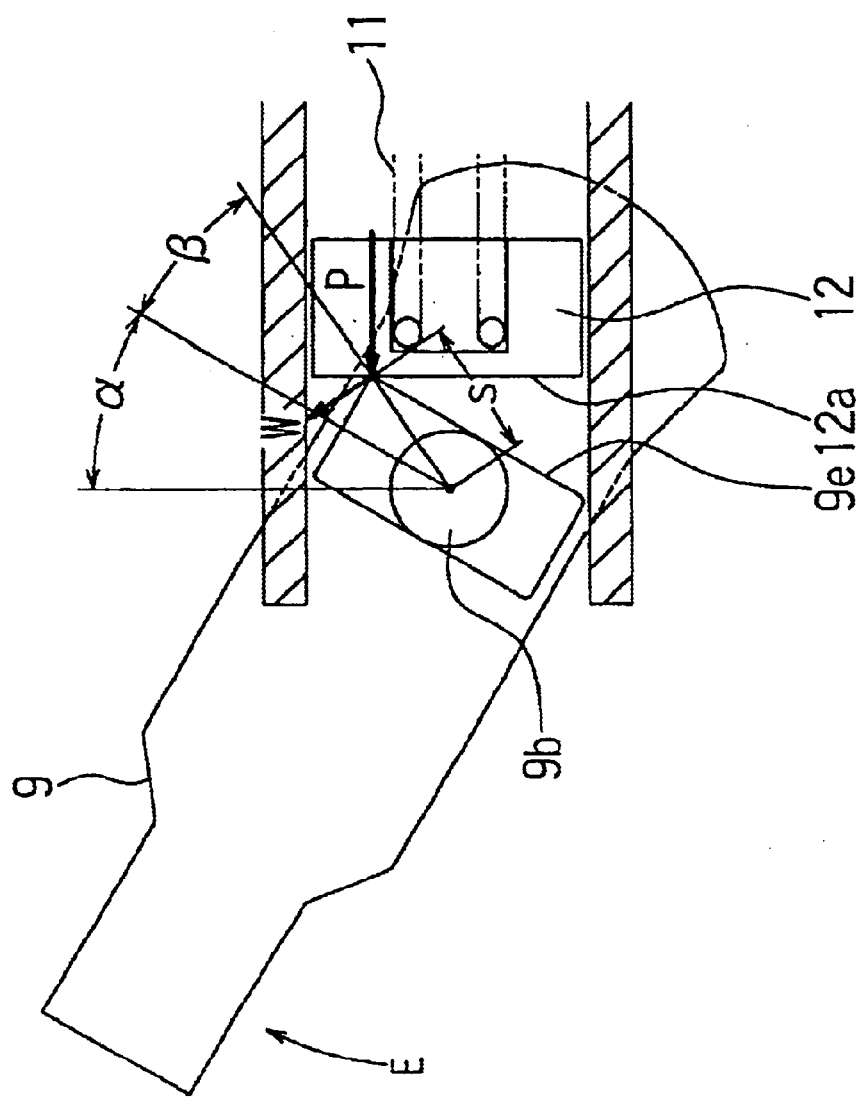
FIG. 8 is a diagram showing the relationship between the rotated cancel cam and the elastic contact material.

FIG. 2 is a perspective view corresponding to FIG. 7.

A cancel cam 20 includes an upper shaft 9b extending upward and a lower shaft 9a coaxial with the upper shaft 9b and extending downward, which are provided on a body 21. The body 21 includes a butting portion 9c having a width smaller than the body 21 and extending toward a steering shaft 14, at the longitudinal end of the body 21.

Pressure contact surfaces 22 in contact with an elastic contact material 30 are formed at the upper half of the body 21 in the direction of thickness on both sides in the cross direction of the upper shaft 9b of the cancel cam 20. Both the pressure contact surfaces 22 are positioned, for example, on a plane passing through the shaft center of the upper shaft 9b. The pressure contact surfaces 22 have only to be positioned closer to the steering shaft than to position G on the control lever 1 side on the peripheral surface of the upper shaft 9b.

A pressure portion 9d formed in a planar fan shape for pushing against a cam guide 13 is provided at the rear end of the body 21, next to the lower half in the direction of thickness thereof.

The upper shaft 9b of the cancel cam 20 is rotatably supported in a long hole 6b of a cover, and moves back and forth along the long hole 6b toward the steering shaft 14. The lower shaft 9a is biased by a coil spring 11 to be brought into pressure contact with an angular projection 2d and moves along the angular projection 2d.

The other structure of the cancel cam 20 is the same as that of the cancel cam 9 shown in FIG. 6.

An elastic contact material 30 includes pressure surfaces 32 to be brought into contact with the pressure contact surfaces 22 of the cancel cam, at the end thereof on the cancel cam 20 side, and a blind hole 12b opened at the other end.

The pressure surfaces 32 include a shaft-escaping recessed portion 34 forming a predetermined gap between it and the upper shaft 9b of the cancel cam 20 when they are brought into contact with the pressure contact surfaces 22 of the cancel cam 20 aligned on a line connecting the steering shaft 14 and the shaft 2a of the swing block 2.

The elastic contact material 30 can be slid along a guide 6d, and is biased toward the cancel cam 20 by the coil spring 11, one end of which is inserted into the blind hole 12b and the other end is supported by a projection 6f in a back wall 6e of the guide.

Figure 4:
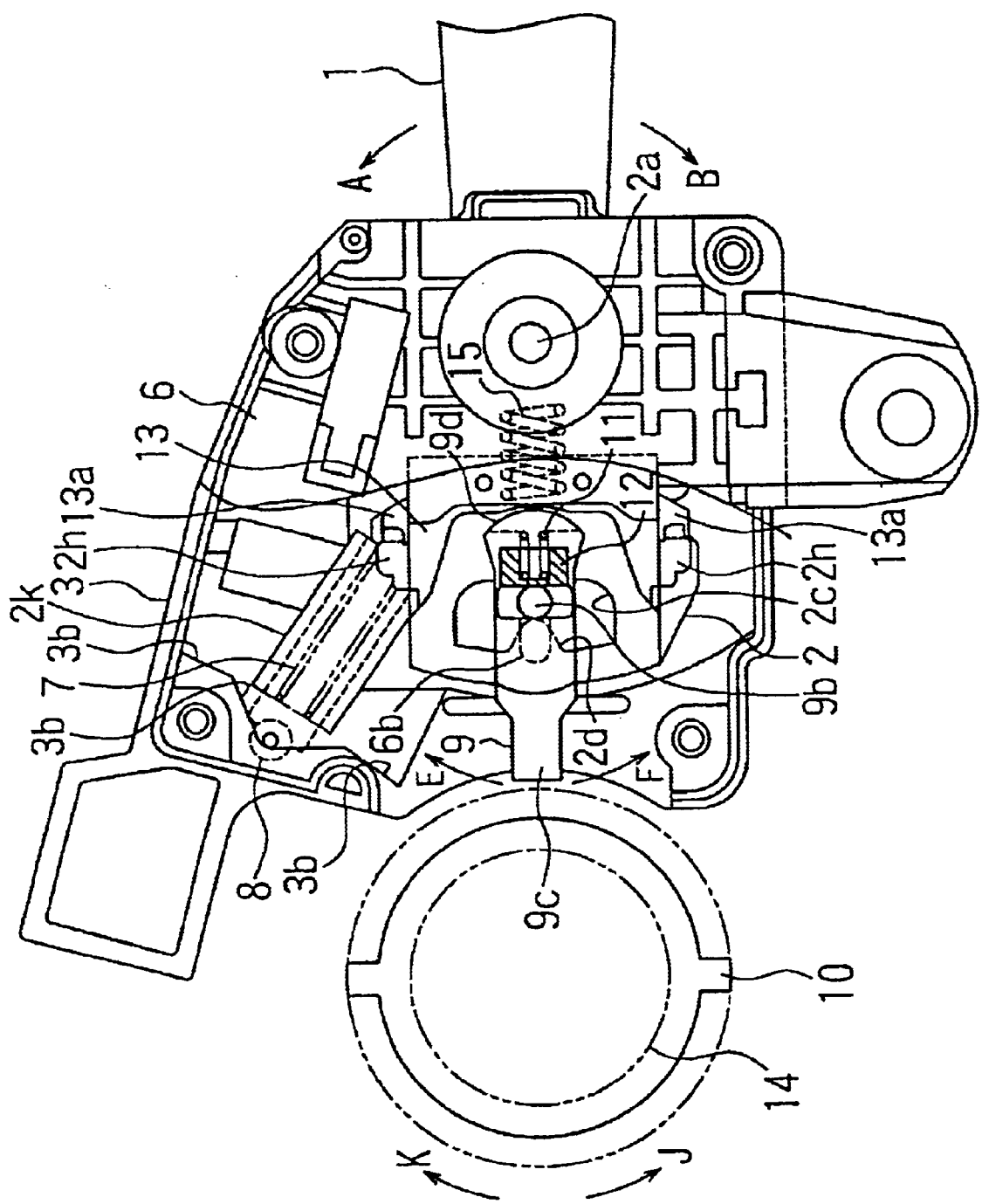
FIG. 4 is a plan view showing a conventional turn signal switch.
Figure 5:
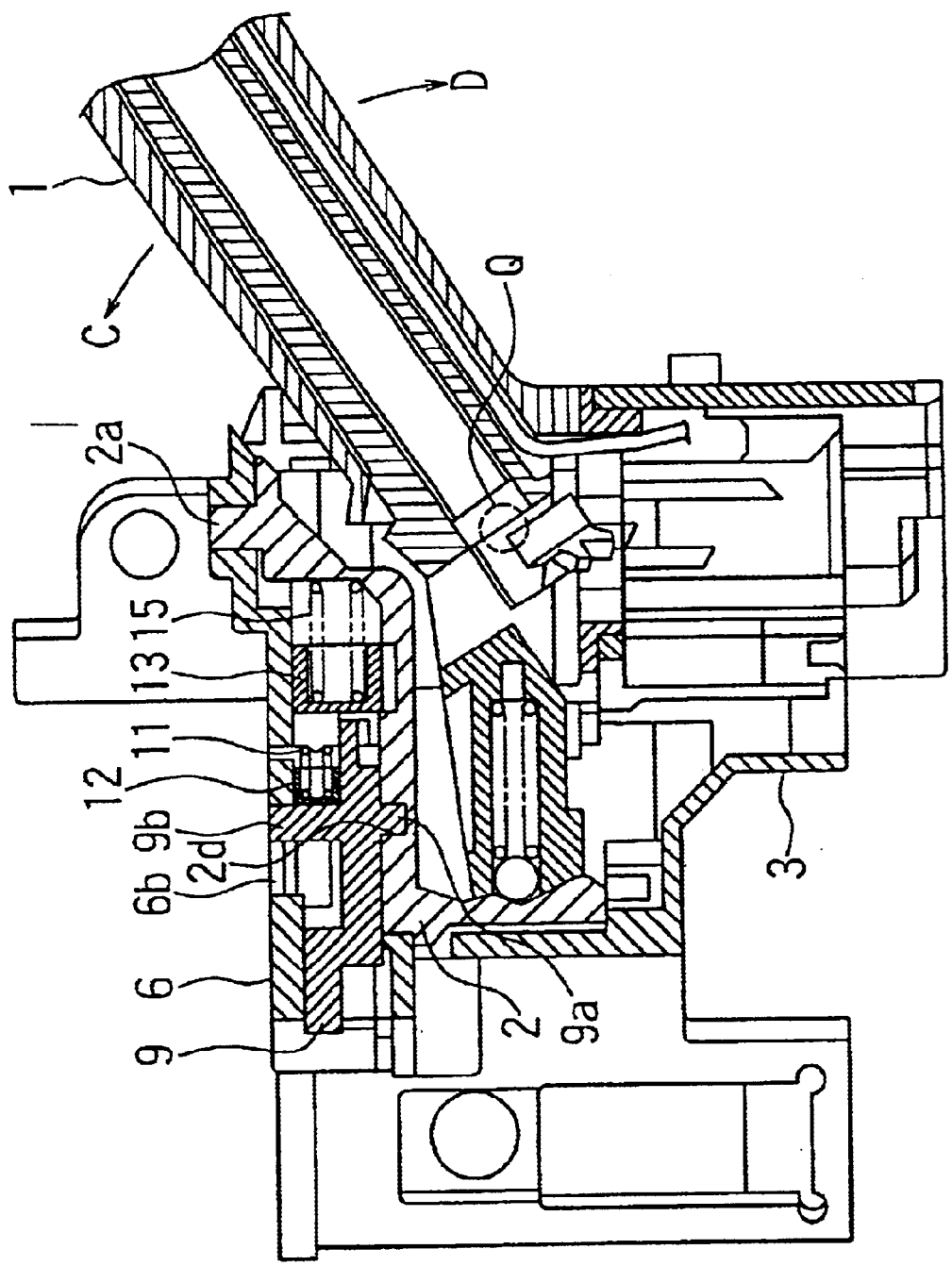
FIG. 5 is a longitudinal sectional view showing the conventional turn signal switch.

In this embodiment, the structure is the same as that of the conventional art shown in FIGS. 4 and 5 except that the cancel cam 9 and the elastic contact material 12 are replaced with the cancel cam 20 and the elastic contact material 30, respectively.

Figure 3:
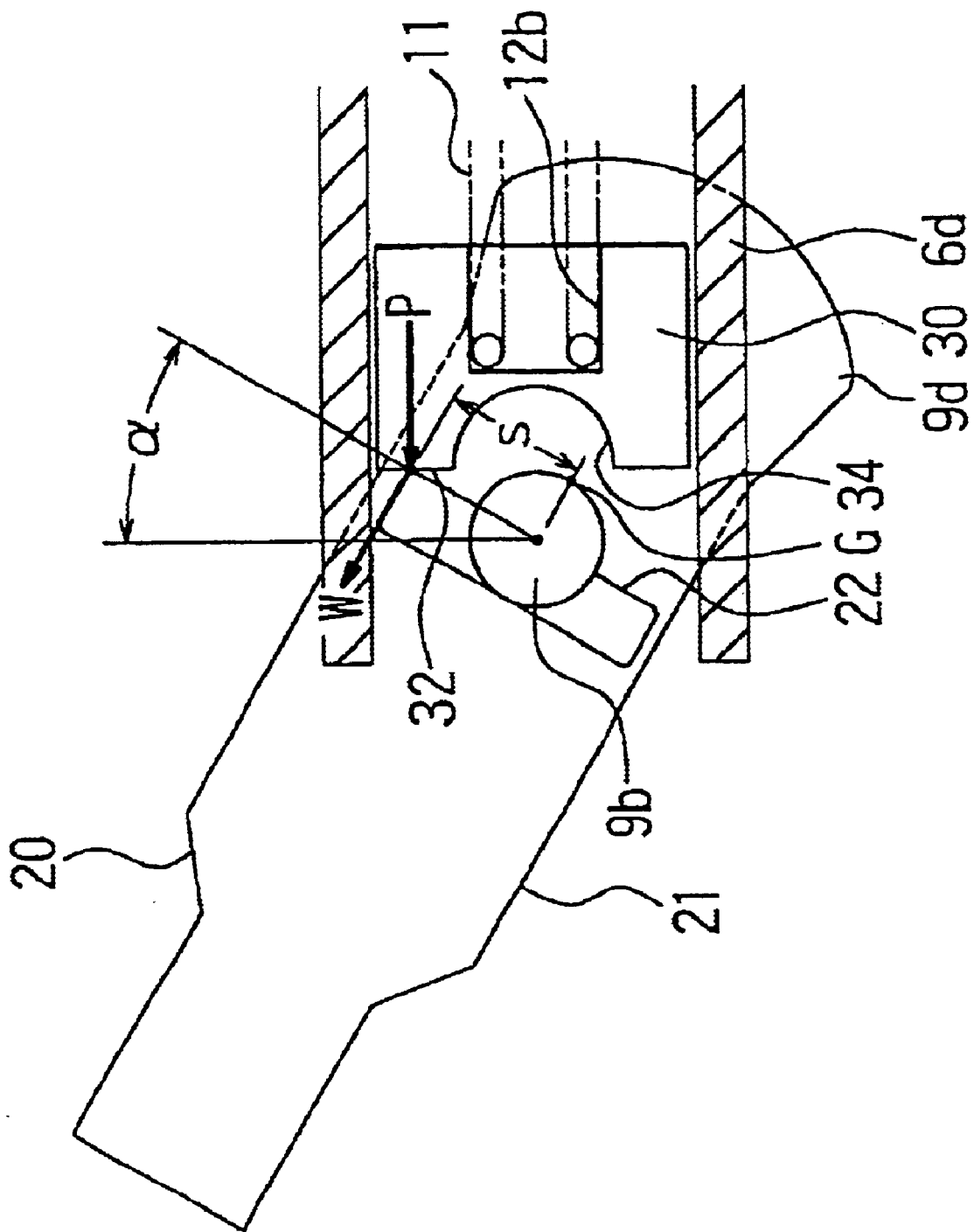
FIG. 3 is a diagram showing the relationship between the rotated cancel cam and the elastic contact material.

In the canceling structure constructed as described above, the pressure contact surfaces 22 of the cancel cam 20 are positioned on a plane passing through the shaft center of the upper shaft 9b; accordingly, in a state in which the cancel cam 9 is rotated to bring the corner at the side end of the pressure contact surface 22 into contact with the pressure surface 32 of the elastic contact material 30, as shown in FIG. 3, the component force W of the pressure force P by the coil spring 11 is expressed as follows:

$$W = P \times \cos\alpha$$

Accordingly, while the length s hardly changes as compared with the conventional structure, the angle β is decreased, thus ensuring a large value of W without changing the size of the coil spring 11, and increasing the moment applied to the cancel cam, thereby ensuring reliable return of the rotated cancel cam 20.

The elastic contact material 30 extends the pressure surfaces 32 toward the cancel cam with the interference with the upper shaft 9b of the cancel cam 20 avoided using the shaft-escaping recessed portion 34, thus being long in its entirety. Accordingly, the inclination in the guide 6d can be reduced, ensuring a smooth sliding of the elastic contact material 30.

As described above, a canceling structure of a combination switch according to the present invention is constructed such that when a cancel pin moves in the same direction as that of a control lever, a cancel cam, the end of which is pushed by the cancel pin to rotate around the shaft, has contact surfaces, the side end of the pressure contact surface is pushed by the pressure surface of an elastic contact material, and when it is released from the cancel pin, it returns to a position before rotation by the pressure from the elastic contact material. Particularly, since the pressure contact surfaces of the cancel cam are formed closer to a steering shaft than to the control lever on the peripheral surface of the shaft, the moment to the cancel cam by the pressure of the elastic contact material increases, thereby ensuring returning of the cancel cam to the position before rotation.

According to the invention of claim 2, the shaft of the cancel cam expands from the pressure contact surfaces toward the elastic contact material and the pressure surfaces of the elastic contact material have a recessed portion for escaping the extension portion of the shaft. Therefore, the pressure surfaces are extended to the pressure contact surfaces longer than the conventional art, increasing the length of the elastic material and thus smoothing the movement along the guide.

What is claimed is:

1. A canceling structure of a combination switch rotatably holding a swing block for supporting a control lever on a fixing side, in which when the control lever is rotated from a neutral position, a cancel cam moves into the path of a cancel pin with the rotation of the swing block, and the cancel cam biases the swing block with the movement of the cancel pin in the opposite direction from the operating direction of the control lever, thereby returning the control lever to the neutral position, wherein:

said cancel cam comprises a shaft to be guided by a long hole provided on the fixing side in parallel with the direction to move into the path of said cancel pin; pressure contact surfaces are provided at positions on the peripheral surface of the shaft, closer to a steering shaft than to said control lever; and when said cancel pin moves in the same direction as the operating direction of the control lever, the end thereof is pushed by the cancel pin, and allowed to rotate around said shaft;

an elastic contact material having pressure surfaces that can be brought into contact with said pressure contact surfaces of the cancel cam is biased along a guide in the moving direction of said cancel cam; and when the cancel cam rotates, the side end of said pressure contact surface is pushed by said pressure surface of the elastic contact material, and when released from the cancel pin, the cancel pin returns to a position before rotation by the pressure from the elastic contact material.

2. The canceling structure of a combination switch of claim 1, wherein:

said shaft of the cancel cam expands from said pressure contact surfaces toward said elastic contact material; and said pressure surfaces of said elastic contact material have a recessed portion for escaping the extension portion of said shaft.

* * * * *